United States Patent [19]

Berkey

[11] Patent Number: 4,763,970

[45] Date of Patent: Aug. 16, 1988

[54] NON-PISTONING CAPILLARY SPLICE

[75] Inventor: George E. Berkey, Pine City, N.Y.

[73] Assignee: Corning Glass Works, Corning, N.Y.

[21] Appl. No.: 82,682

[22] Filed: Aug. 7, 1987

[51] Int. Cl.$^4$ .............................................. G02B 6/38
[52] U.S. Cl. ................................................. 350/96.21
[58] Field of Search ................ 350/96.20, 96.21, 96.22

[56] References Cited

U.S. PATENT DOCUMENTS

| | | | |
|---|---|---|---|
| 4,033,668 | 7/1977 | Presby | 350/96.21 |
| 4,179,186 | 12/1979 | Tynes | 350/96.21 |
| 4,257,674 | 3/1981 | Griffin et al. | 350/96.21 |
| 4,422,717 | 12/1983 | Schmidt | 350/96.21 |
| 4,448,483 | 5/1984 | Pyley | 350/96.21 |
| 4,519,672 | 5/1985 | Rogstadius | 350/96.21 |
| 4,537,468 | 8/1985 | Degoix et al. | 350/96.21 |
| 4,544,234 | 10/1985 | De Vean et al. | 350/96.21 |
| 4,585,304 | 4/1986 | Winter et al. | 350/96.21 |
| 4,647,150 | 3/1987 | De Santi et al. | 350/96.21 |
| 4,712,682 | 12/1987 | Lightstone | 350/96.21 |

FOREIGN PATENT DOCUMENTS

| | | | |
|---|---|---|---|
| 0061423 | 9/1982 | European Pat. Off. | 350/96.21 |
| 2814090 | 10/1978 | Fed. Rep. of Germany | 350/96.21 |
| 3429626 | 2/1986 | Fed. Rep. of Germany | 350/96.21 |

Primary Examiner—William L. Sikes
Assistant Examiner—Robert E. Wise
Attorney, Agent, or Firm—Walter S. Zebrowski

[57] ABSTRACT

An optical fiber splice wherein a hollow cylindrical glass member is provided defining a longitudinal cylindrical aperture therein. Means adjacent the aperture defining a longitudinal groove parallel to the longitudinal aperture and in communicating relationship therewith is formed therein. A pair of tapered apertures are formed at each end of the glass member extending inwardly from the end surfaces and merging with the longitudinal cylindrical aperture and the longitudinal groove.

3 Claims, 1 Drawing Sheet

NON-PISTONING CAPILLARY SPLICE

CROSS-REFERENCE TO RELATED APPLICATIONS

This application is related to my U.S. application Ser. No. 082,680 entitled "Capillary Splice and Method", my and U.S. patent application Ser. No. 082,679 entitled "Method of Making Precision Shaped Apertures in Glass", both applications filed on even date herewith.

BACKGROUND OF THE INVENTION

A pistoning affect may be occasioned when making capillary splices as described in my copending application Ser. No. 082,680 if the clearance between the outside diameter of the fibers being spliced and the inside diameter of the splice member is small and the ends of the fibers are dipped in optical oil for improved signal transmission before insertion into the splice member. That is, as the fibers are inserted into the capillary splice from each end thereof, some of the optical oil may have difficulty in escaping from between the fiber ends if the clearance between the fiber and the splice aperture is small. Of course, the splice may still be effected as described in my companion application, however, some time may be consumed in allowing the oil to escape through the small clearance. Such a condition is herein referred to as pistoning.

SUMMARY OF THE INVENTION

In view of the foregoing, it is an object of the present invention to provide an improved optical fiber splice defining a precision shaped and dimensioned longitudinal aperture and one which facilitates rapid formation of making a low loss splice. It is a further object of the present invention to provide an optical fiber splice that may be assembled promptly and in a non-pistoning manner.

Briefly, according to the present invention, a hollow cylindrical glass member defining a longitudinal aperture therein is provided. A longitudinal groove is formed parallel and adjacent to the longitudinal aperture and communicating therewith. A pair of tapered apertures are formed in the ends of the glass member or splice communicating with the longitudinal aperture and the groove to improve the means for introduction of fibers into the longitudinal aperture of the glass members or splice.

These and additional objects, features and advantages of the present invention will become apparent to those skilled in the art from the following detailed description and the accompanying drawing, which is incorporated and constitutes part of the present specification, on which, by way of example, only the preferred embodiments of this invention are illustrated.

DESCRIPTION OF THE PREFERRED EMBODIMENTS

It is to be noted that the drawings are illustrative and symbolic of the present invention and there is no intention to indicate scale or relative proportions of the elements shown therein.

Figure 1:
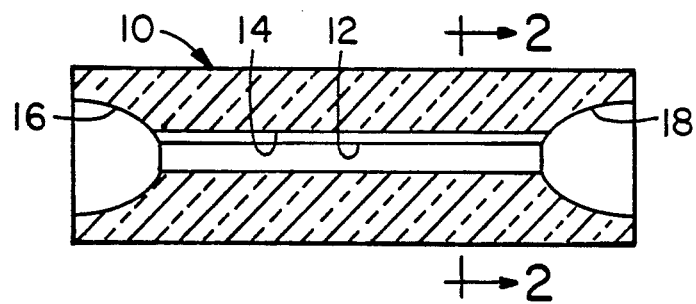
FIG. 1 is a cross-sectional elevation of a splice in accordance with the present invention.

Referring to FIG. 1, there is provided a hollow glass cylindrical member or splice 10. Although the preferred glass is silica, any workable and stable glass may be used as the material for member 10. As will be understood, member 10 may be formed in anyway known in the art. For a teaching of application of particular material, consolidation, drawing and generally forming a hollow glass member reference is hereby made to U.S. Pat. No. 3,659,915 to R. D. Maurer and P. C. Schultz, U.S. Pat. No. 3,711,262 to D. B. Keck and P. C. Schultz, U.S. Pat. No. 3,737,292 to D. B. Keck, P.C. Schultz and F. Zimar, U.S. Pat. No. 3,737,293 to R. D. Maurer, U.S. Pat. No. 3,775,075 to D. B. Keck and R. D. Maurer, U.S. Pat. No. 3,806,570 to J. S. Flamenbaum, P. C. Schultz and F. W. Voorhees, U.S. Pat. No. 3,859,073 to P. C. Schultz, U.S. Pat. No. 3,884,550 to R. D. Maurer and P. C. Schultz, U.S. Pat. No. 3,933,454 to R. D. DeLuca, U.S. Pat. No. 4,286,978 to A. C. Bailey and S. B. Miller, U.S. Pat. No. 4,289,517 to A. C. Bailey and S. B. Miller and U.S. Pat. No. 4,310,339 to M. G. Blankenship, all of which patents are hereby expressly incorporated herein by reference. My copending application Ser. No. 082,680 entitled "Capillary Splice and Method" and my copending patent application Ser. No. 082,679 entitled "Method of Making Precision Shaped Apertures in Glass" teach the specifics of making an optical fiber splice and a precision shaped aperture therein; which applications are also expressly incorporated herein by reference.

Figure 2:
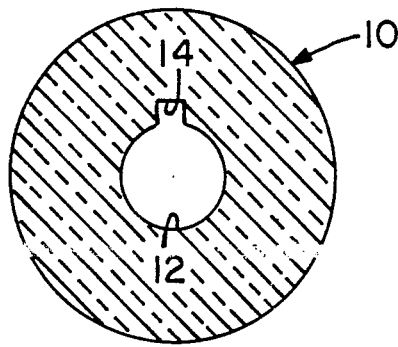
FIG. 2 is a cross-sectional illustration of the splice along line 2—2 of FIG. 1.

Glass cylindrical member 10 defines a longitudinal aperture 12 extending intermediate the ends of member 10. Adjacent aperture 12, there is formed a longitudinal groove 14 parallel to longitudinal aperture 12 and communicating therewith. Referring additionally to FIG. 2, the cross-section along lines 2—2 of FIG. 1 is illustrated. As is seen, longitudinal groove 14 communicates with aperture 12 at the circumference thereof.

Tapered apertures 16 and 18 communicating with longitudinal aperture 12 and groove 14 are formed in member 10 as described in my copending application Ser. No. 082,679.

Figure 3:
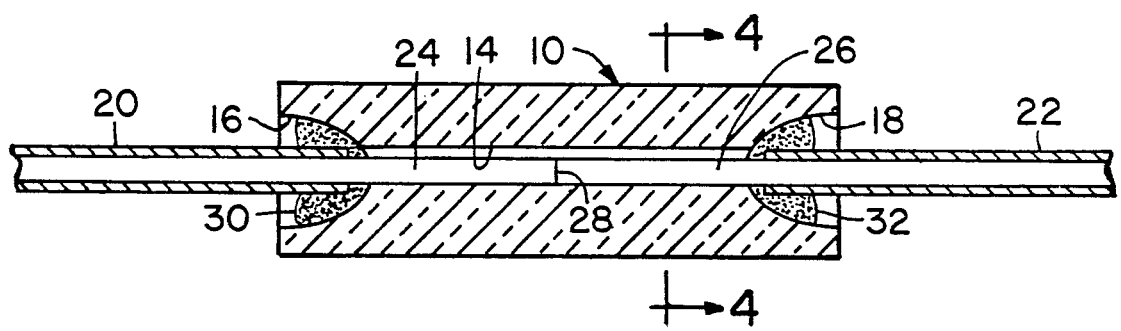
FIG. 3 is a cross-sectional view of a pair of fibers connected together by the splice of the present invention.

Referring additionally to FIG. 3, the exterior resin coating on fibers 20 and 22 is removed providing uncoated portions 24 and 26 respectively.

To facilitate better signal transmission from one fiber to the other, the bare fiber ends are dipped in an optical oil, not shown, before inserting them into the hollow cylindrical member of splice 10 to increase the light transmission efficiency from one fiber to the other. Such optical oil may be silicone oil or silicone grease as is well known in the art. The fibers are then inserted into splice 10 until the ends of the fibers meet intermediate the ends of the splice as illustrated by reference numeral 28 shown in FIG. 3. Even though the clearance around the uncoated ends 24 and 26 of the fibers and the longitudinal aperture 12 of splice 10 is small, the fibers are readily inserted therein since the excess optical oil is permitted to escape by means of groove 14 rather than be trapped between the fiber ends. In this manner, the fiber ends are disposed adjacent each other intermediate the ends of splice 10 and may be immediately affixed thereto.

A quantity of adhesive or cement 30 and 32 is then disposed in apertures 16 and 18 respectively surrounding the extending fibers so as to permit the fibers to be affixed to splice 10. After the adhesive or cement is cured, fibers 20 and 22 remain rigidly attached to splice 10 with the ends thereof abutting each other intermediate the ends of the splice.

Figure 4:
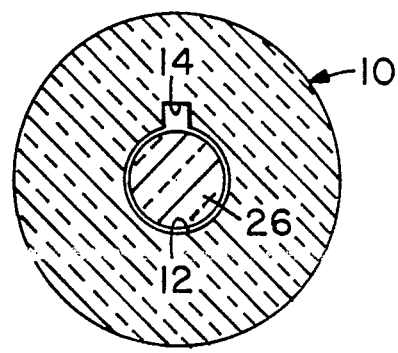
FIG. 4 is a cross-sectional view of the splice of FIG. 3 along lines 4—4.

Referring to FIG. 4, a cross-section along lines 4—4 of FIG. 3 is illustrated. As is shown, a snug fit between fiber 26 and aperture 12 still permits an easy insertion of fiber 26 after it has been dipped in an optical oil since the excess oil is removed by means of groove 14.

A typical example of the present invention is as follows. A hollow glass cylindrical member or splice was formed with tapered, funnel-like apertures in the ends thereof as taught in my copending application "Capillary Splice and Method" Ser. No. 082,680 with a precision aperture and groove being formed as taught in my copending application Ser. No. 082,679 entitled "Method of Making Precision Shaped Apertures in Glass". The splice was one inch in length and had a longitudinal aperture or bore diameter of 127.0 $\mu$m. A groove was formed adjacent the longitudinal aperture and parallel thereto at the circumference of the aperture. The dimensions of the groove were 6 microns in width by 10 microns in depth.

Two fibers having an outside diameter of 125 $\mu$m were provided with the resin coating thereon removed from the ends thereof. The uncoated ends were then square cut to a length of about one-half inch using a GTE fiber cutter. The uncoated ends were then each dipped into a silicone optical oil. The uncoated end of one of the fibers was inserted into one of the tapered apertures of the splice so that its end was intermediate the ends of the splice aperture. The uncoated end of the second fiber was inserted in the other tapered aperture of the splice and into the longitudinal aperture so that it was disposed with its end adjacent the end of the first fiber. Both fibers were easily inserted into the aperture with the excess silicone oil being removed by means of the longitudinal groove. No pistoning action was encountered wherein the silicone oil tended to become compressed as a result of the silicone oil leakage past the fiber being slow. The splice was non-pistoning.

A quantity of Norland UV curable glue was disposed in each tapered aperture and cured by exposing it to UV light to cure for about one minute. In this manner, both fibers were rigidly affixed to the non-pistoning capillary splice with the ends thereof abutting each other.

Splice losses measured on such splices for single-mode fibers were typically as low as 0.1 db/km.

The present invention has been particularly shown and described with reference to preferred embodiments thereof, however, it will be understood by those skilled in the art that various changes in the form and details may be made therein without departing from the true spirit and scope of the invention as defined by the following claims.

I claim:

1. An optical fiber splice comprising:
 a hollow glass cylinder having first and second end surfaces and defining a longitudinal cylindrical aperture therein,
 means adjacent said aperture defining a longitudinal groove parallel to said longitudinal aperture and in communicating relationship therewith,
 a portion of said hollow cylinder adjacent said first end surface defining a tapered aperture extending inwardly from said first end surface and merging with said longitudinal cylindrical aperture and said longitudinal groove, and
 a portion of said hollow cylinder adjacent its second end surface defining a tapered aperture extending inwardly from said second end surface and merging with said longitudinal bore and said longitudinal groove.

2. The optical fiber splice of claim 1 wherein the diameter of said longitudinal aperture is between about 0.1 and 3 microns larger than the diameter of the fibers to be spliced.

3. The optical fiber splice of claim 2 wherein sid longitudinal groove is about 10 microns deep.

* * * * *